(12) United States Patent
Mockenhaupt et al.

(10) Patent No.: US 11,635,143 B2
(45) Date of Patent: Apr. 25, 2023

(54) MULTI-LAYER GASKET WITH IMPROVED FATIGUE RESISTANCE

(71) Applicant: Dana Automotive Systems Group, LLC, Maumee, OH (US)

(72) Inventors: Martin Mockenhaupt, Buffalo Grove, IL (US); Shaleena Daisy, Naperville, IL (US); Jason Tyrus, Tinley Park, IL (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 338 days.

(21) Appl. No.: 16/601,506

(22) Filed: Oct. 14, 2019

(65) Prior Publication Data

US 2021/0108724 A1  Apr. 15, 2021

(51) Int. Cl.
   *F16J 15/08*  (2006.01)

(52) U.S. Cl.
   CPC .................. *F16J 15/0825* (2013.01)

(58) Field of Classification Search
   CPC .............. F16J 15/0825; F16J 15/0818; F16J 2015/0862; F02F 11/002
   See application file for complete search history.

(56) References Cited

U.S. PATENT DOCUMENTS

| | | | | |
|---|---|---|---|---|
| 4,290,616 A | * | 9/1981 | Nicholson | F16J 15/0825 277/592 |
| 5,087,058 A | * | 2/1992 | Miura | F16J 15/0825 277/595 |
| 5,490,681 A | * | 2/1996 | Plunkett | F16J 15/0825 277/592 |
| 5,938,208 A | * | 8/1999 | Yoshida | F16J 15/0825 277/592 |
| 6,676,134 B1 | * | 1/2004 | Wiegert | F16J 15/0825 277/593 |
| 10,443,730 B2 | * | 10/2019 | Yasuda | F16J 15/0818 |
| 2004/0041352 A1 | * | 3/2004 | Hohe | F16J 15/0818 277/593 |
| 2005/0145501 A1 | * | 7/2005 | Bendik | C25D 7/00 205/137 |

(Continued)

FOREIGN PATENT DOCUMENTS

| | | | | |
|---|---|---|---|---|
| JP | 59047562 A | * | 3/1984 | .......... F16J 15/0825 |
| JP | 01285644 A | * | 11/1989 | .......... F16J 15/0825 |

(Continued)

OTHER PUBLICATIONS

"IMO Oberflächentechnik GmbH—Schüttgutautomat," YouTube Website, Available Online at https://www.youtube.com/watch?v=1QcJhBAuNBM, Nov. 10, 2015, 3 pages.

(Continued)

*Primary Examiner* — Eugene G Byrd
(74) *Attorney, Agent, or Firm* — McCoy Russell LLP

(57) ABSTRACT

A multi-layer head gasket having at least two active layers and a shim layer sandwiched there between. The gasket and shim layer include cylinder openings aligned with the cylinders disposed within an engine block. The shim layer incorporates a plated portion for adding topography to an otherwise flat shim layer, the areas of plating determined based on FEA and/or pressure film load testing, for improving fatigue resistance, sealing pressure, and/or loading characteristics of the gasket.

14 Claims, 9 Drawing Sheets

(56) References Cited

U.S. PATENT DOCUMENTS

| | | | | |
|---|---|---|---|---|
| 2005/0200085 A1* | 9/2005 | Kasuya | ............... | F16J 15/0825 277/628 |
| 2007/0090607 A1* | 4/2007 | Ueta | ................... | F16J 15/0825 277/593 |
| 2007/0090608 A1* | 4/2007 | Ueta | ................... | F16J 15/0818 277/593 |
| 2009/0152819 A1* | 6/2009 | Schneider | ........... | F16J 15/0825 277/593 |
| 2011/0095492 A1* | 4/2011 | Takeda | ................ | F16J 15/0825 277/598 |
| 2012/0175847 A1* | 7/2012 | Popielas | ................ | F02F 11/002 277/592 |
| 2013/0106065 A1* | 5/2013 | Schweiger | ........... | F16J 15/0831 277/594 |
| 2014/0042705 A1* | 2/2014 | Foster | ................... | F02F 11/002 277/313 |
| 2014/0042711 A1* | 2/2014 | Foster | ................. | F16J 15/0825 277/594 |
| 2014/0265156 A1* | 9/2014 | Okano | ................ | F16J 15/0825 277/595 |
| 2015/0226152 A1* | 8/2015 | Haberer | ............... | F16J 15/0825 277/593 |
| 2017/0191445 A1* | 7/2017 | Mahoney | ............... | F16J 15/104 |
| 2018/0119818 A1* | 5/2018 | Ide | ...................... | F01N 13/1827 |

FOREIGN PATENT DOCUMENTS

| | | | | | | |
|---|---|---|---|---|---|---|
| JP | 2012007645 | A | * | 1/2012 | ........... | F16J 15/0825 |
| JP | 2012036967 | A | * | 2/2012 | ........... | F16J 15/0825 |
| JP | 2012082851 | A | * | 4/2012 | ........... | F16J 15/0825 |
| JP | 2012112394 | A | * | 6/2012 | ........... | F16J 15/0825 |
| JP | 2015117757 | A | * | 6/2015 | ........... | F02F 11/002 |
| JP | 2017120098 | A | * | 7/2017 | ........... | F16J 15/0825 |

OTHER PUBLICATIONS

"Reel to reel plating," YouTube Website, Available Online at https://www.youtube.com/watch?v=_HFQZVSc1Zg, Dec. 17, 2018, 3 pages.

* cited by examiner

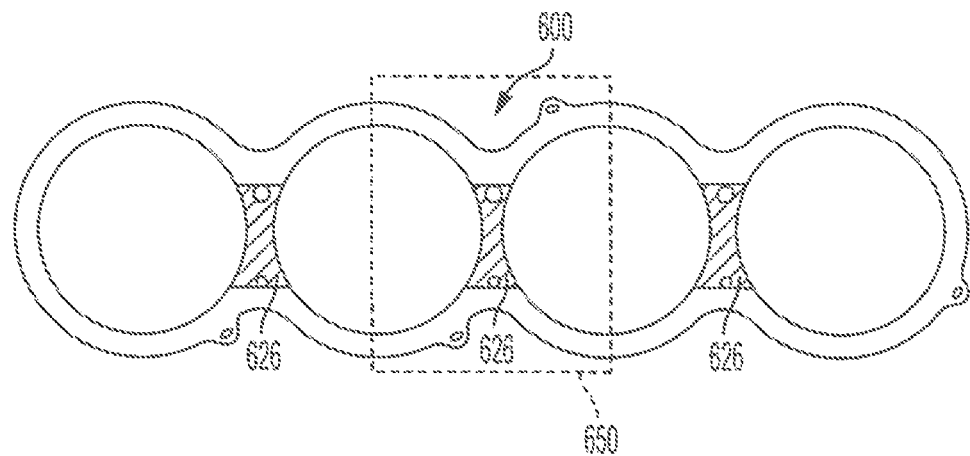
FIG. 6
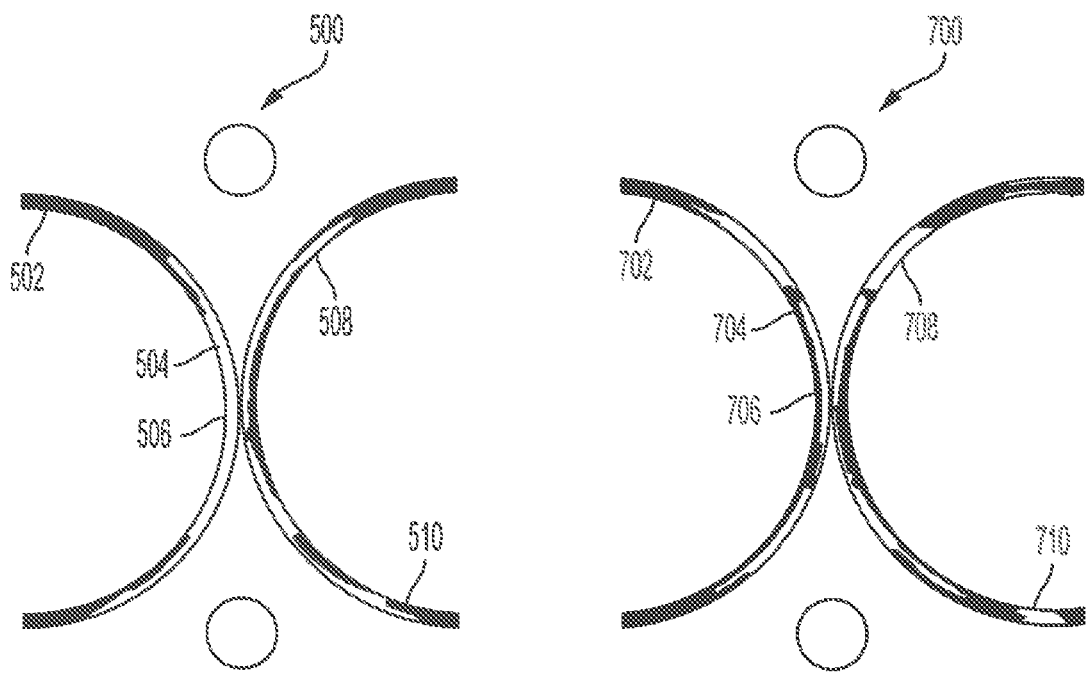
FIG. 5
FIG. 7

MULTI-LAYER GASKET WITH IMPROVED FATIGUE RESISTANCE

TECHNICAL FIELD

The present disclosure relates to multiple layer gaskets, and, more particularly, to multi-layer steel (MLS) automotive cylinder-head gaskets with improved fatigue resistance.

BACKGROUND AND SUMMARY

In general, gaskets are used for sealing the interface between two structures. Many gaskets attempt to provide a fluid tight seal between the two structures so that fluids within the structures do not leak or otherwise escape from the structures. Automotive cylinder-head gaskets, or head gaskets, are gaskets which sit between the engine block and the cylinder head(s) in an internal combustion engine. The gaskets seal the cylinders to allow for maximum compression within the cylinder without leakage of coolant or engine oil into the cylinders or combustion gases from the cylinders. Different types of head gaskets are available. Composite type head gaskets are typically made from asbestos or graphite and rely on compression between the engine block and cylinder head for proper function. Multiple layer gaskets, or multi-layer steel (MLS) gaskets, typically rely on various geometries, material properties, and other factors for proper function. Typical MLS head gaskets are made of two to five sheets of spring or carbon steel, referred to as active layers, sandwiched between sealing material. In operation, as the cylinder-head lifts due to compression in the cylinder, the active layers exert a spring pressure to maintain contact between the block and the head, maintaining a seal for the joint between the two. As the cylinders repeatedly compress and decompress, a properly functioning head gasket should maintain a seal between the block and head. To accomplish this, the head gasket must be strong enough to withstand joint motion (between the block and head) and the high pressures and temperatures associated with the combustion cylinders. For very high output engine applications, the head gaskets must accommodate severe joint motion and high pressures and temperatures which often requires additional layers to increase endurance.

Consequently, there is a need for gaskets with improved fatigue resistance. The present inventors determined that, especially for higher performance engine applications, MLS gasketed joints have had difficulty sealing at the mid-span point between adjacent bolts used to fasten the head to the block. Greater motion occurs at the mid-span point between bolts, and this is due to the mechanics of the bolted joint. The farther the distance from the bolt, the present inventors postulate, the greater the motion in reaction to the firing pressure. The present inventors determined that the continuous motion reduces material strength in these areas and failures of the gasket due to material fatigue cracking. The present inventors determined that, especially for MLS gaskets, increased fatigue resistance may be achieved by reducing motion and carefully designing for stresses and strains.

In order to address the higher motion, the present inventors developed techniques to increase the stiffness of one or more surfaces of the gasket, or one or more surfaces of components comprising the gasket, via mechanical means. An increased height is applied to the shim areas to increase the sealing pressure locally. Additionally, via other less precise methods, a layer of metal may be mechanically coined or swaged to provide variable height and, as a result, provide variable stiffness to the gasket.

To address at least some of the aforementioned problems, a method of selectively increasing the stiffness of a surface of a gasket is provided. The method includes identifying a start location and a stop location on at least one side of the gasket surface; masking the gasket surface by applying a maskant; and depositing a metallic material on the gasket surface based on the identified start and stop locations. The metallic material is deposited in at least one unmasked area of the gasket surface, which causes the gasket surface to have a variable thickness.

Due to an increase in thickness/height on selected areas of the gasket, the motion exerted on the gasket is reduced and the gasket has increased fatigue resistance and higher initial load. The thickness/height of the gasket may be increased in total by about 5 to 60 microns in certain areas.

In some embodiments, the metallic material comprises aluminum, copper, nickel, nickel Teflon, electroless nickel, and/or any combinations thereof.

In some embodiments, masking comprises liquid masking, tape masking, UV-curable masking, paint masking, plug masking, custom molded masking, moving masking, screen printing, and/or any combinations thereof.

In an embodiment, metallic material is deposited on the gasket surface through electroplating.

In an alternative embodiment, metallic material is deposited on the gasket surface through electroless plating.

In an embodiment, a multi-layer head gasket comprises at least two active layers; a shim layer sandwiched between at least two active layers, with the active layers and the shim layer having aligned cylinder openings adapted such that the multi-layer gasket is sealably securable between an engine head and an engine block, and such that the cylinder openings of the gasket align with cylinders disposed within the engine block; and a plated portion of the shim layer, with the plated portion adding topography to an otherwise flat shim layer.

In an embodiment, a shim layer for use in a multi-layer head gasket comprises a substantially planar layer adapted to be interleaved between two active layers of the multi-layer gasket, with the active layers and the shim layer having aligned cylinder openings adapted such that the multi-layer gasket is sealably securable between an engine head and an engine block, and such that the cylinder openings of the gasket align with cylinders disposed within the engine block; and a plated portion of the shim layer, the plated portion adding topography to an otherwise flat shim layer.

In an embodiment, the plated portion comprises aluminum, copper, nickel, nickel Teflon, electroless nickel, and/or any combination thereof.

In an embodiment, the plated portion comprises metallic material deposited on the shim layer surface via electroplating.

In an embodiment, the plated portion comprises metallic material deposited on the shim layer surface via electroless plating.

In an embodiment, the shim layer is plated on both a head side and a block side.

In an embodiment, the plated portion comprises between about 5 and 30 microns of metallic material deposited on at least one side of the shim layer.

In an embodiment, an area of the plating portion is determined by finite element analysis or measurements of joint load using a pressure sensitive film.

In an embodiment, the plating portion comprises bridge areas between adjacent cylinder openings.

In an embodiment, the plating portion comprises plating on both a head side of the bridge areas and a block side of the bridge areas.

In an embodiment, the plating on the head side covers a different surface area than the plating on the block side of each of the bridge areas.

In an embodiment, the plating portion comprises a plurality of individual portions of the shim layer, each of the individual portions positioned about the perimeter of one or more of the cylinder openings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 5 illustrates a contrast change of a pressure-sensitive paper after seal line surface pressure tests are performed for a web portion of a gasket before plating.

FIG. 6 illustrates a top plan view of a gasket showing plated areas of a shim semi-stopper.

FIG. 7 illustrates a contrast change of a pressure-sensitive paper after seal line surface pressure tests are performed for a web portion of a gasket after plating.

DETAILED DESCRIPTION

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 1:
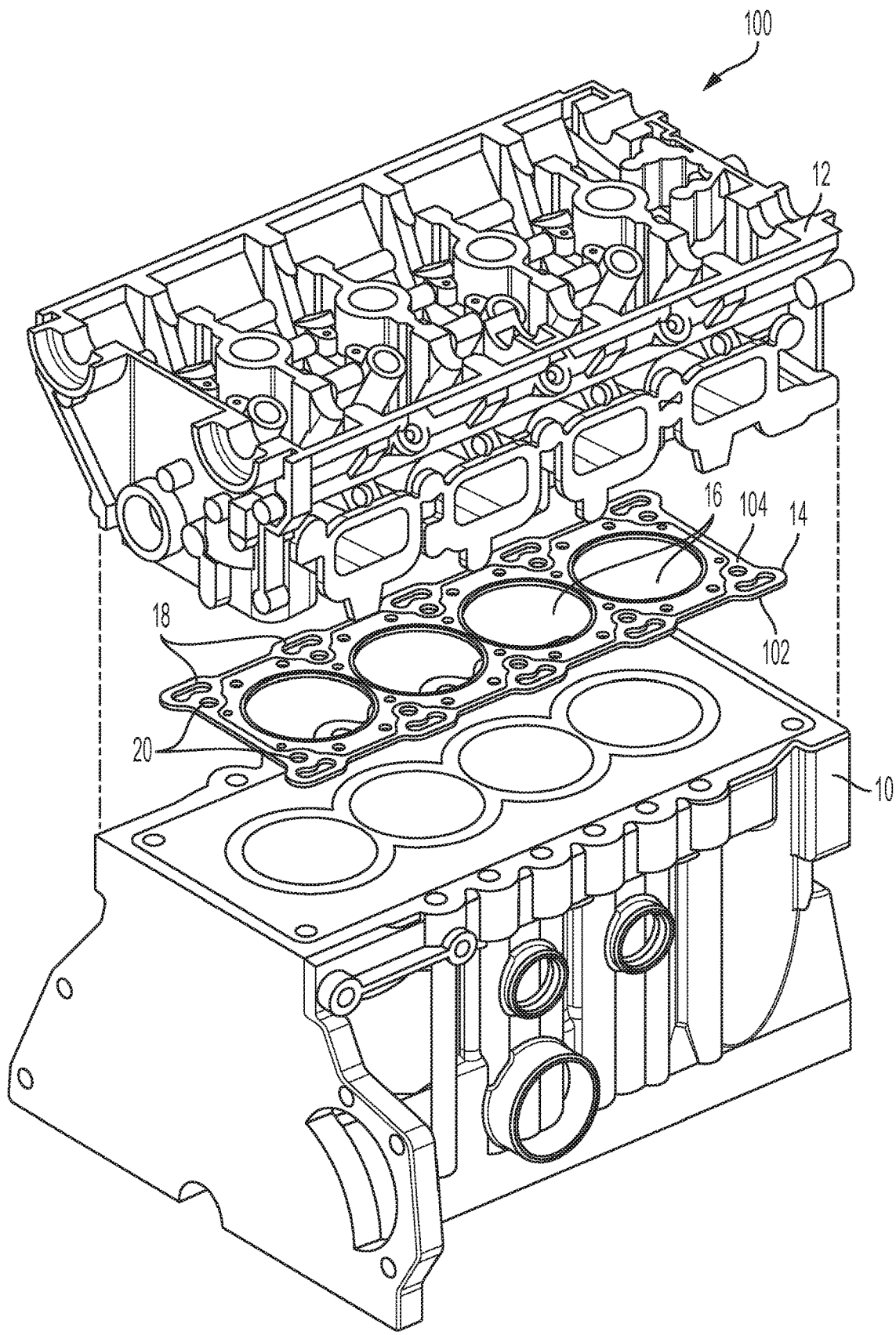
FIG. 1 illustrates a perspective exploded view of an engine block, a gasket, and a cylinder head.
Figure 2:
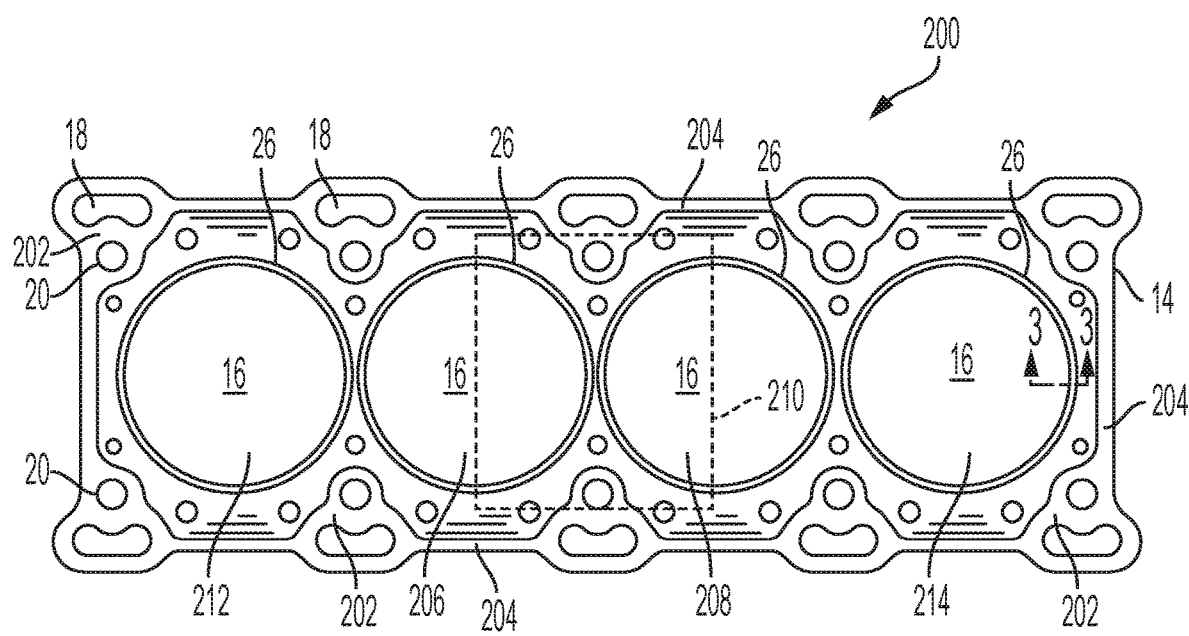
FIG. 2 illustrates a top plan view of the gasket illustrated in FIG. 1.
Figure 3A:
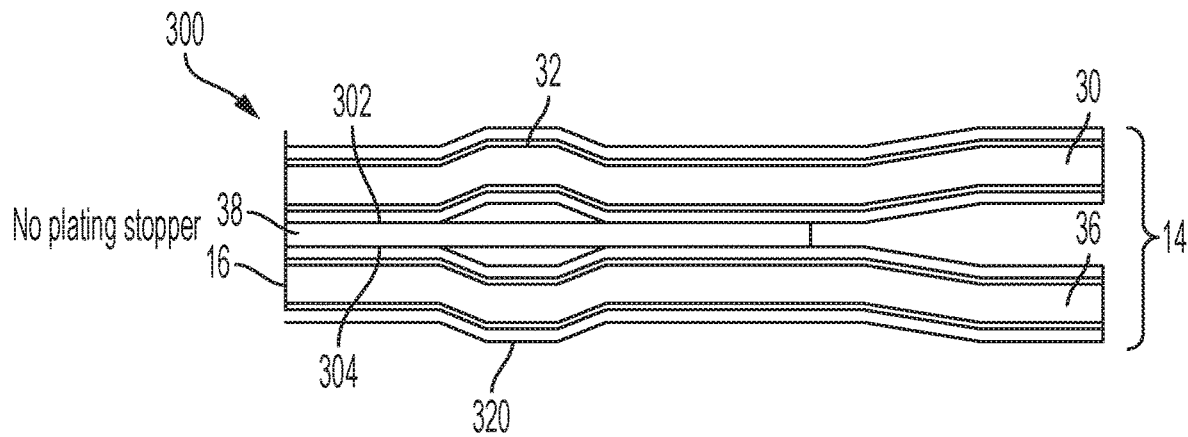
FIGS. 3A-3C illustrate cross-sectional side views along 3-3 of FIG. 2.
Figure 3B:
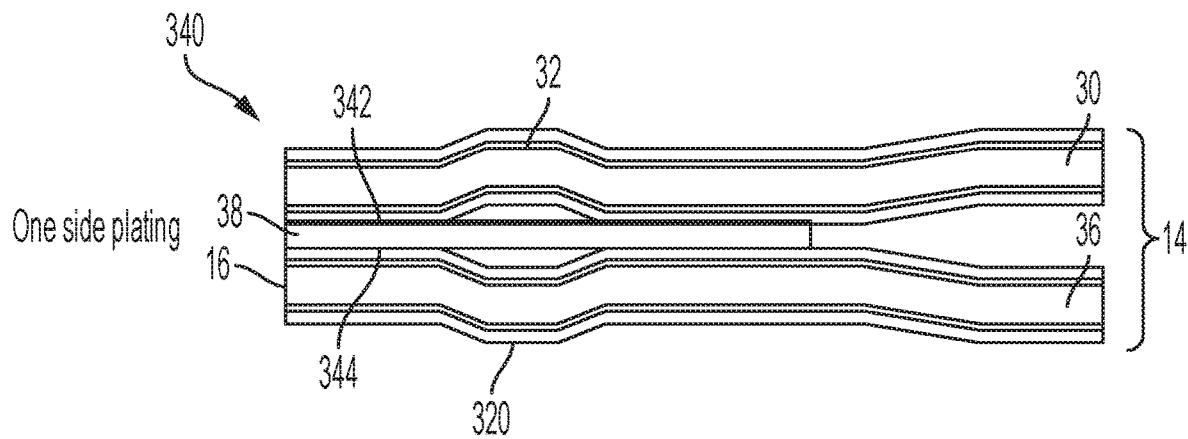
Figure 3C:
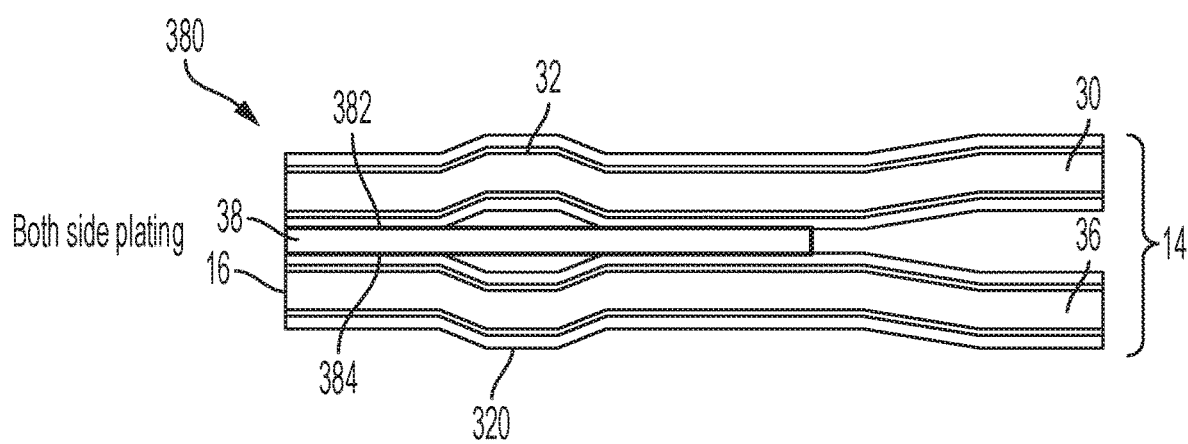
Figure 4:
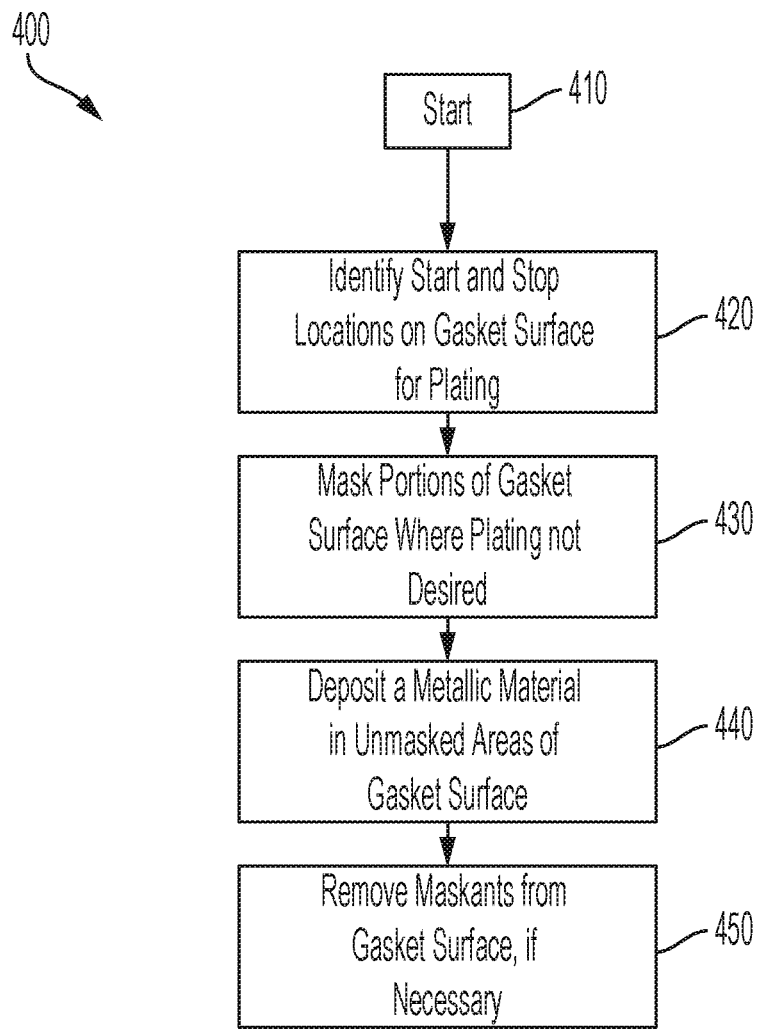
FIG. 4 illustrates a flow chart depicting an exemplary method of creating a variable stiffness surface of a gasket.
Figure 8A:
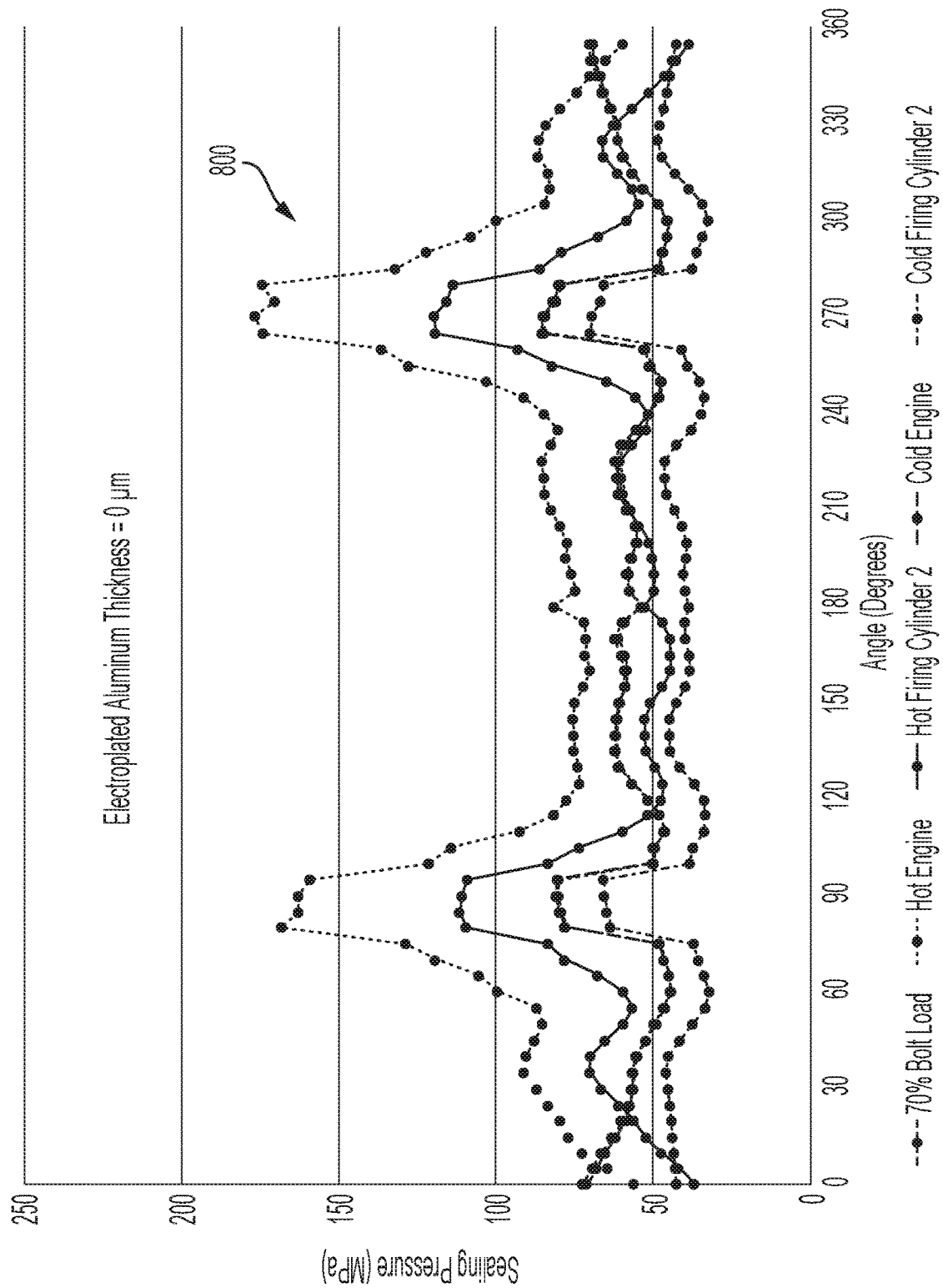
FIGS. 8A and 8B depict results of a Finite Element Analysis model simulation showing changes in sealing pressure on a gasket before and after plating, respectively.
Figure 8B:
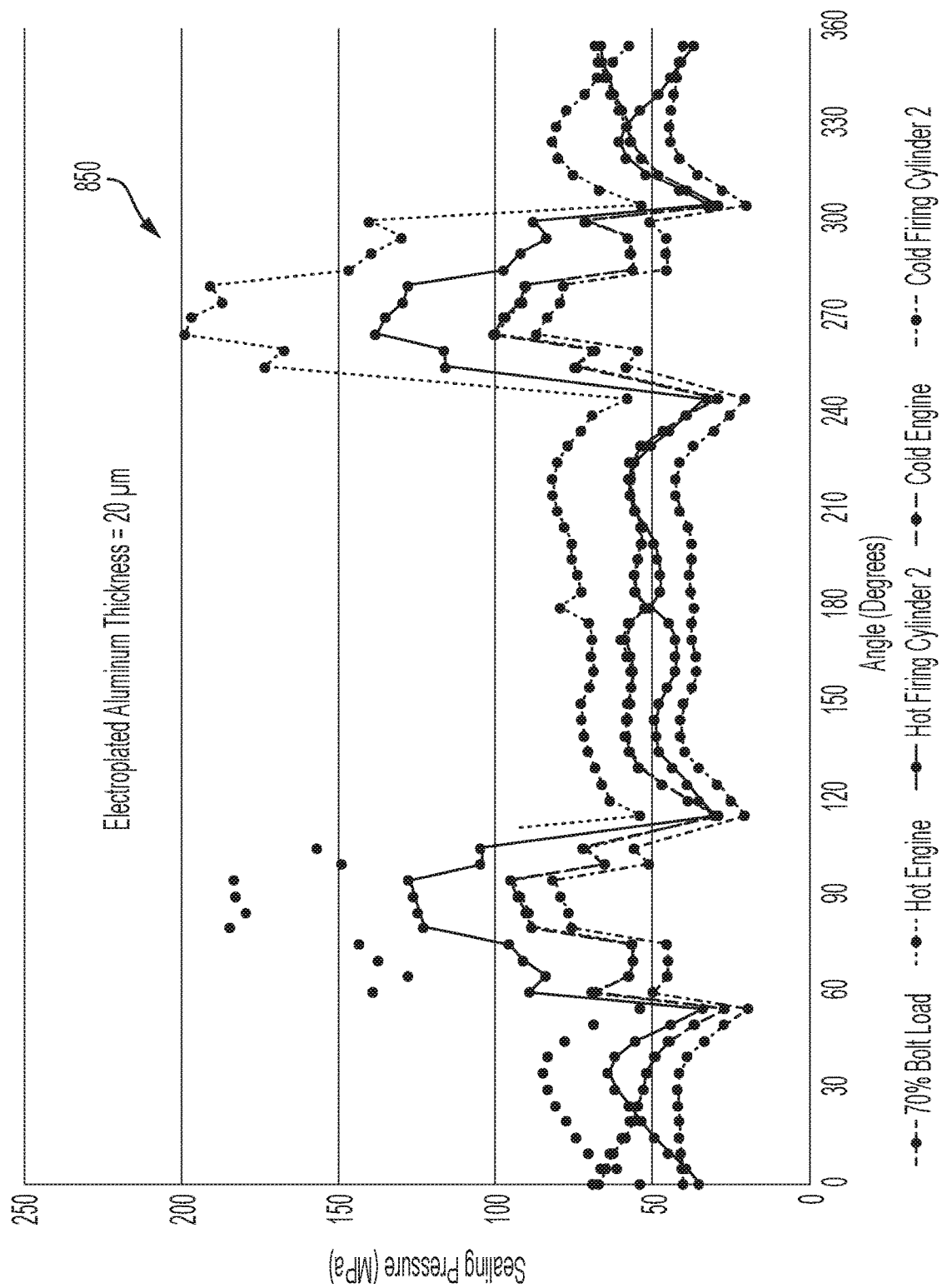
Figure 9:
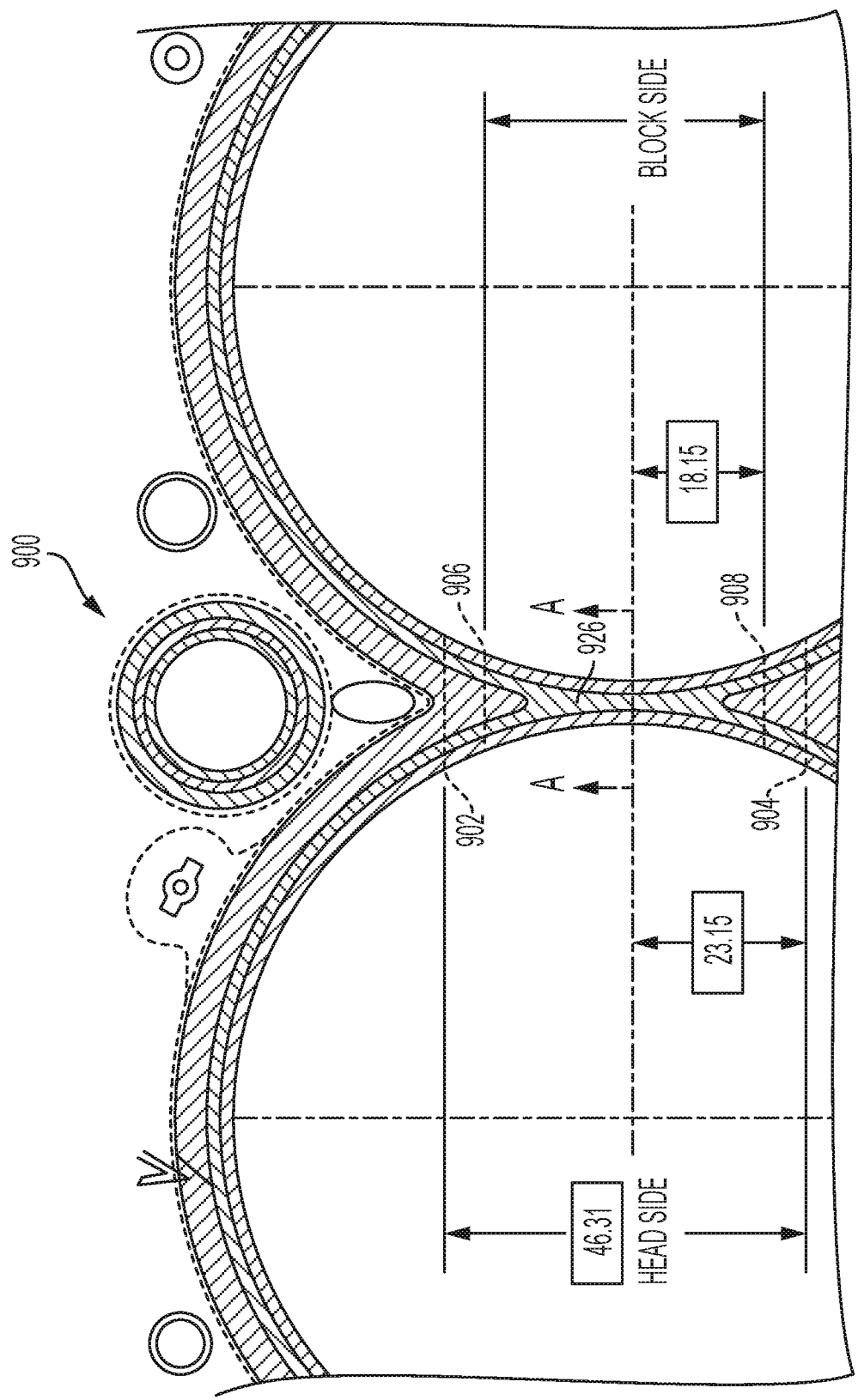
FIG. 9 illustrates a top plan view of a shim bridge portion of a gasket plated on head and block sides, where the head side is plated to a larger area than the block side, and there is additional thickness where the head and block plated areas overlap.
Figure 10:
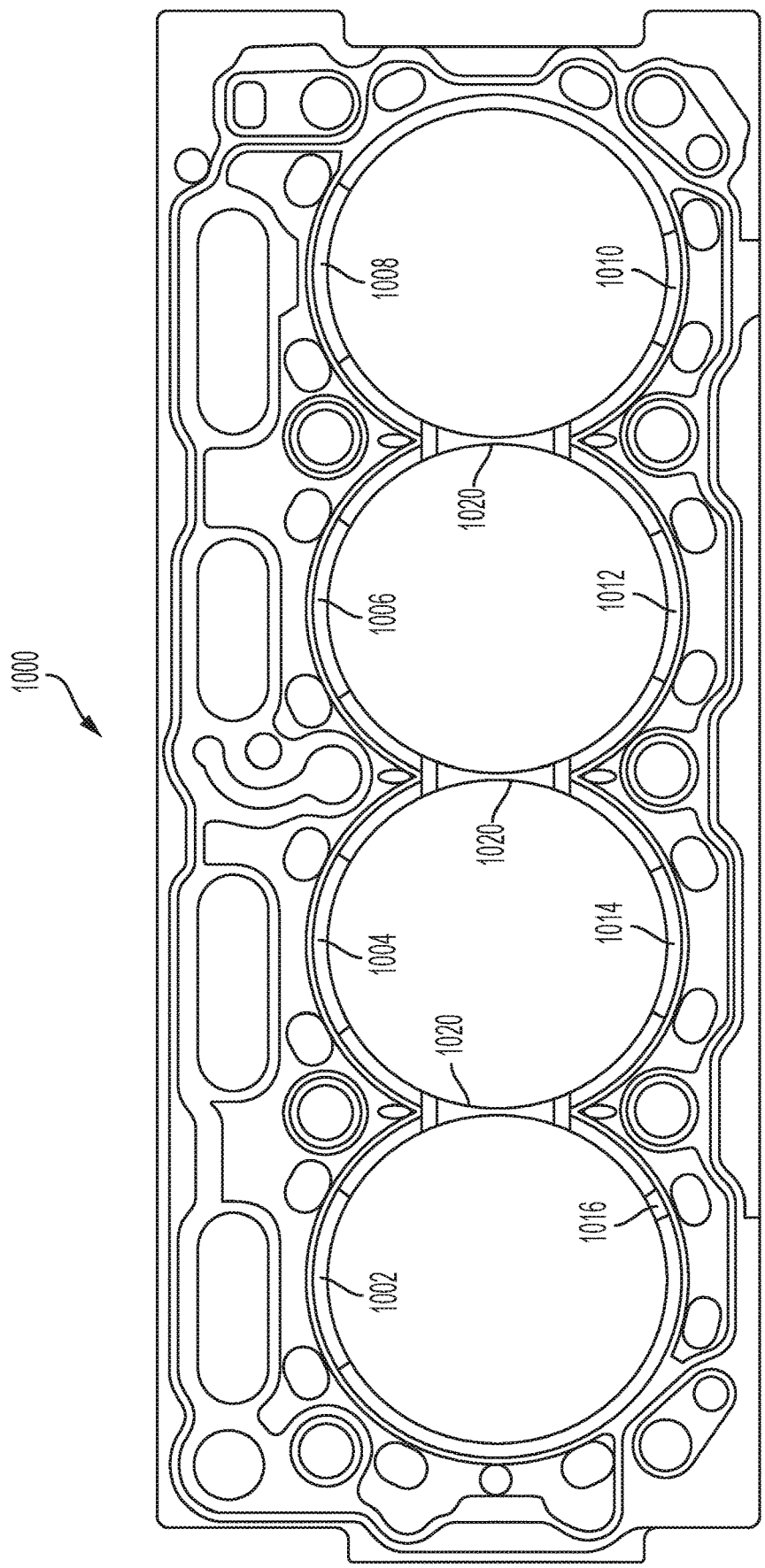
FIG. 10 illustrates a top plan view of a gasket plated at multiple locations.

As an overview, FIG. 1 shows an exemplary gasket in the context of an engine block and cylinder-head. FIG. 2 shows a top view of the gasket in more detail and identifies both cross-sectional views (in FIGS. 3A, 3B, and 3C) and a detail area (referenced in FIGS. 5-7) between the middle two cylinder/combustion openings (showing a narrow area, or web or bridge area between the two cylinder openings). FIGS. 3A, 3B, and 3C show unplated and plated variations of an exemplary cross-section of a gasket nearest a cylinder/combustion opening. FIG. 4 provides an exemplary process flow for selectively plating one or more portions of a gasket or gasket layer or shim/semi-stopper/shim semi-stopper component of a multi-layer gasket. FIGS. 5-7 show improvements in a loading characteristic of the gasket having a shim semi-stopper with plating in a bridge area between adjacent cylinder openings. Sealing pressure improvements for such gasket (with plated shim bridge) are shown in FIGS. 8A and 8B. Finally, FIGS. 9 and 10 illustrate embodiments wherein plating is selectively added to different areas (including, optionally, plating on one or both sides) of a gasket material component (such as a shim semi-stopper) based on determined weaknesses of a gasket joint, the weaknesses determined based on finite element analysis/FEA simulation and/or pressure film loading testing.

FIG. 1 shows an exploded perspective view 100 of an embodiment of an engine block 10, a cylinder head 12, and a cylinder head gasket 14. The gasket 14 comprises a plurality of holes, as shown in FIG. 2. The holes may comprise combustion openings (cylinder bores) 16, fluid openings 18, and mechanical fastener openings 20. The number, size, and arrangement of openings 16, 18, and 20 vary depending on the type of engine application. The gasket 14 provides a sealing function between the engine block 10 and the head 12, as well as for the combustion openings 16, the fluid openings 18, and the mechanical fastener openings 20. While one embodiment of the gasket 14, the engine block 10, and the cylinder head 12 are depicted, the shape and size of each may vary from the depiction in FIG. 1. Although the block-gasket-head 100 shown in FIG. 1 comprises what may be referred to as an in-line four cylinder configuration, other configurations may be used. For example, V6, V8, or in-line six cylinder configurations may be used. Different engines may use different block configurations, requiring differently configured head gaskets (with different numbers of combustion/cylinder openings 16), or more than one head gasket 14.

The head gasket 14, shown in FIG. 1 as a substantially rectangular, planar sheet, has a top or head side 104 for sealable contact with the underside contact face of head 12, and a block side 102 for sealable contact with the upper side, or top contact face of the block 10. With through holes (combustion openings 16) sized and oriented to accommodate the engine cylinders in the block 10, the gasket 14 seals the cylinders to allow for maximum compression within the cylinder without leakage of coolant or engine oil into the cylinders or combustion gases from the cylinders. In operation, as the cylinder-head 12 lifts upward due to compression in any of the cylinders, the gasket 14 should maintain sealed contact between the block 10 and the head 12. As the cylinders repeatedly compress and decompress, the head gasket 14 is subjected to adverse conditions. To maintain a proper seal, the present inventors determined that the head gasket 14 must be strong enough to withstand joint motion (between the block and head) and the high pressures and temperatures associated with the combustion cylinders. For very high output engine applications, the head gaskets may need to accommodate unusually severe joint motion and high pressures and temperatures.

The present inventors determined that, especially for higher performance engine applications, the gasket joints, and in particular MLS type gasketed joints, have had difficulty sealing at the mid-span point between adjacent bolts, such as adjacent bolts using adjacent fastener openings, used to fasten the head to the block. Greater motion occurs at the mid-span point between bolts, and this is thought to be due to the mechanics of the bolted joint. The farther the distance from the bolt, the present inventors determined, the greater the motion in reaction to the cylinder firing pressure. The present inventors determined that the continuous motion reduces material strength in these areas and leads to material fatigue and failures of the gasket due to material fatigue. The present inventors discovered that, especially for MLS type gaskets, increased fatigue resistance may be achieved by reducing motion and carefully designing for stresses and strains.

In preferred embodiments, the gasket (such as gasket 14) comprises a multi-layer gasket or a multi-layer steel (MLS) type gasket. MLS gaskets comprise two to five (most commonly three) thin layers of steel interleaved with elastomer. The contact faces (such as the head side 104 and block side 102 surfaces of gasket 14) are typically coated with a coating such as rubber for adherence to respective contact faces of the cylinder-head and block. However, the gasket (such as gasket 14) may be fabricated from other suitable materials, including but not limited to sheet steel, multi-layer steel, sheet copper, solid copper, composite such as asbestos or graphite, elastomeric material such as steel core plate with molded in place silicone rubber beads, and/or other elastomeric materials.

As best shown in FIG. 2 and as a non-limiting example, the gasket 14 may include one or more stoppers/semi-stoppers 26 that encircle each of the combustion openings 16, and the gasket material preferably also encircles one or more of the fluid openings 18 and one or more of the mechanical fastener openings 20. The top view 200 in FIG. 2 depicts a gasket 14 having four cylinder openings 16 which include openings for cylinder one 212, cylinder number two 206, cylinder number three 208, and cylinder number four 214. Ten fluid flow openings 18 are shown, each positioned along the periphery 204 with four along one side of the cylinder openings and four along the other side of the four cylinder openings. Immediately inward from each of the fluid openings 18 is positioned a fastener hole 20 (through which a fastener (e.g. bolt) passes for interconnecting the block and head, thereby placing loading forces on the gasket material therebetween). As shown in FIG. 2, the center of each cylinder opening substantially aligns with the mid-span between adjacent bolt holes. In other words, perpendicular lines intersecting the mid-points between adjacent bolt holes 20 converge at the centers of the cylinder openings. The present inventors determined the gasket tends to be weakest in the narrower areas mid-span between the bolt fastening locations, especially the narrow (web or bridge) areas between adjacent cylinder openings.

The areas around the periphery 204 and around and between the fluid openings 18 and fastening/bolt holes 20, such as the areas shown by numeral reference 202, are sometimes referred to as embossments. The embossments typically are a raised bead ring surrounding each of the cylinder openings, for example the portions shown in FIG. 2 with the numeral reference 26. The embossments of the gasket help seal the head and block when the fastening bolts are torqued into place. The stoppers/semi-stoppers 26, or more accurately the outward surfaces on the head side and block side (such as head side 104 and block side 102 of the gasket 14) that are associated with raised bead areas encircling each of the cylinder openings, preferably allow for concentration of the compressive stresses into a specific region to enhance the sealing effects of the gasket.

The stoppers/semi-stoppers 26 are preferably generally annular in shape and have a thickness of about 0.05 mm to 0.20 mm. Material comprising each of the stoppers/semi-stoppers 26 may be connected with one another to form interconnected rings, such as for example a shim semi-stopper as shown in FIG. 6. The stoppers/semi-stoppers 26 are preferably made of steel, stainless steel, or an alloy steel. However, other suitable material may be employed.

FIG. 2 is described as depicting a top plan view of a gasket such as gasket 14, and as such, the features shown correspond to features in a head side 104 of the gasket. In preferred embodiments, the head side and block side of the gasket are mirror images of each other. Preferably, all the features of the block side 102 of gasket 14 are described as the same as for the corresponding features of the head side 104 of gasket 14. For example, the embossments shown and described in FIG. 2 for the head side of the gasket are also preferably included on the block side of the gasket.

FIGS. 3A-3C, show partial cross sectional side views through line 3-3 as indicated in FIG. 2. In these views, the gasket (such as gasket 14) has a first metallic substrate layer 30 that preferably includes a combustion sealing bead 32 integrally formed with the first substrate layer 30. A second metallic substrate layer 36 is preferably a mirror image of the first metallic substrate layer 30, the second substrate layer 36 preferably having a combustion sealing bead 320. A shim layer 38 is found between the first substrate layer 30 and the second substrate layer 36. The shim layer 38 may extend continuously and uninterrupted from the combustion openings 16 past the combustion sealing bead 32. As used herein, the shim layer is also referred to as a shim semi-stopper or simply, a stopper. The layers on either side of the shim layer (such as layers 30 and 36) (which preferably include sealing bead portions and/or other embossments) are also referred to as active layers (of a multi-layer gasket). As shown in FIGS. 3A, 3B, and 3C, corresponding to the cut line 3-3 indicated in FIG. 2, the shim semi-stopper material (such as shim layer 38) extends from the cylinder opening 16 on the far left, toward the right to a distance beyond the sealing bead (such as sealing bead 32).

FIGS. 3A, 3B, and 3C illustrate, respectively, a multi-layer structure 300 without plating, a multi-layer structure 340 with plating on one side of stopper material, and a multi-layer structure 380 with plating on both sides of stopper material. In FIG. 3A, the shim layer 38 is shown not plated. The stopper layer 38 is shown having side 302 (adjacent to layer 30) and side 304 (adjacent to layer 36), neither of which includes any plating. In FIG. 3B, the shim layer 38 is shown plated on portions of one side (side 342 adjacent to layer 30), and the other side (side 344 adjacent to layer 36) is shown without plating. In FIG. 3C, the shim layer 38 is shown plated on portions of both sides (side 382 adjacent to layer 30, and side 384 adjacent to layer 36).

Turning now to FIG. 4, an exemplary method 400 of creating a variable stiffness surface of a gasket according to embodiments (such as gasket 14 illustrated in FIGS. 1, 2, 3A, 3B, and 3C). The present inventors discovered that the stiffness (and therewith fatigue resistance, sealing pressure, and/or loading characteristics) of a surface of a gasket (such as gasket 14) may be varied by varying the location and amount of metallic material deposited on the gasket. The metallic material may be selected from, but are not limited to, aluminum, copper, nickel, nickel Teflon, electroless nickel, and any combinations thereof. In preferred embodiments, aluminum is deposited on a shim semi-stopper via electroplating. Preferably, the thickness (or height), surface area, and specific locations of the deposited material are determined based on determined weakness areas of the gasket or gasket joint. Preferably, the weakness areas of the gasket or gasket joint are determined based on finite element analysis, FEA simulation(s), and/or pressure film testing of joint/gasket loading. In some embodiments, weakness areas of the gasket or gasket joint are determined at least in part using performance data collected from testing or after a duration of use of the gasket.

The metallic material may be deposited through a variety of methods, including electroless plating/deposition, electroplating, chemical deposition, and vapor deposition. The deposition of metallic material increases the thickness at various surfaces on a gasket, such as the gasket 14, in order to prevent and/or reduce the fatigue failure on the gasket. Examples of some deposition/plating surfaces include the first substrate layer 30, the second substrate layer 36, the stoppers/semi-stoppers 26, the shim layer 38, and/or a layer having embossments thereon.

The method 400 begins at a start state 410 and proceeds to block 420 where specific locations to stop and start depositing metallic material on a surface of the gasket 14 are identified, along with the amount of metallic material to be deposited. These locations initially identified manually by human eye and then refined through the use of software on a computing device. In some embodiments, these locations are associated with areas of lower stress on the gasket 14. Examples of such locations are at a combustion seal, at the stoppers/semi-stoppers 26, and at areas farthest from bolts, such as mid-spans.

The present inventors discovered that joint motion is reduced by deposited metallic material at locally weak stress areas. The increased thickness increases stiffness, thereby preventing undesirable high motion in the weak areas and increasing fatigue life of the combustion seal/head gasket. The present inventors discovered that particularly weak areas (such as the bridge/narrow/web areas between adjacent cylinder openings) are improved by increasing height/thickness in a second plating process using a different masked area to achieve double plating in the weak areas. The present inventors discovered that shim stoppered designs (i.e. multi-layer gasket designs incorporating a shim semi-stopper) that incorporate the plating as described herein permits topography to be added in a flat shim, which has not previously been possible. The present inventors determined that plating as described herein to add topography in a flat shim, improves gasket performance, especially for narrow areas such as the bridge/web areas between adjacent cylinder openings.

Fine tuning of the design (to further identify where to add plating) is preferably performed using CAE optimization to determine an optimal design by varying thickness and plating locations so as to minimize joint motion for the entire combustion opening. Additional fine tuning, the present inventors discovered, preferably includes varying areas plated such that one side of a shim has a larger plated (thickened) surface area than the other side. For example, improved gasket performance, the present inventors discovered, is achieved by plating a head side of a bridge area portion of a shim semi-stopper to have a bridge portion plating area that is larger (for example, 10 mm longer) than a plating area applied to the reverse side (the block side) of the same bridge portion of the gasket. Improvements achieved with such additional fine tuning is described in further detail with regard to FIGS. 9 and 10.

Referring back to FIG. 4, as shown in block 430, masking is used to protect one or both sides of a surface of the gasket 14 from being deposited with metal. Each side of the surface may be fully or partially masked depending on the location and amount of metallic material to be deposited. For example, one side of a surface may be masked at a time, or both sides of a surface of the gasket 14 may be simultaneously masked. In an alternative embodiment, one side of a surface of the gasket 14 is masked prior to masking the other side.

Masking depends on desired sealing applications and the amount of maskant to be used. Masking techniques may comprise liquid masking, metallic tape masking, non-metallic tape masking, UV-curable masking, paint masking, plug masking, custom molded masking, and/or any combinations thereof. Liquid masking comprises the application and removal of stop-off lacquers on a surface of a gasket through dipping, painting, or spraying. Tape masking comprises the application and removal of metallic or non-metallic tape, such as a silicone adhesive tape.

For high volume masking applications, techniques such as continuous tape masking or moving masking may be used to increase efficiency of the masking process. Another embodiment for masking portions of a gasket comprises screen printing. Screen printing involves printing with systems that use a plate (screen mask) made of a screen mesh woven with synthetic fiber. Screen printing involves passing a maskant through the fine mesh of a screen mask by the pressure of squeegee or other tool in order to print (coat) maskant onto a substrate.

Next, as shown in block 440, a surface of a gasket, such as the first substrate layer 30, the second substrate layer 36, the stoppers/semi-stoppers 26, the shim layer 38, or a layer having embossments thereon, are deposited with metallic material. Metallic material is deposited on gasket surfaces that have not been previously masked. The areas of deposition are preferably areas of determined weaknesses and/or areas where increased loading is desired, as discussed herein. Increasing material thickness with selectively plating specific areas of the gasket, the present inventors discovered, increases stiffness and reduces joint motion in these areas, thereby improving the fatigue life of the gasket.

The amount of metallic material to be deposited on gasket surfaces depends at least in part on the surface conditions of the surfaces being plated. The thickness and height of plating on a specific surface on the gasket 14 is determined by the amount of plating exposure time and the location of masking. As described herein, preferably between about 5 and 40 microns of metallic material is deposited on a side of a surface of a gasket.

In some examples, only one side of a gasket surface is deposited with metal via a single-step deposition process. In yet other examples, a surface of a gasket may be plated using two or more rounds of metallic deposition, where one side of a surface is plated more than once.

In some embodiments, plating is deposited by reel to reel controlled depth plating, reel to reel spot plating, reel to reel strip plating, and/or reel to reel tape masking plating. Reel to reel spot plating comprises plating deposited in a pattern of spots on non-masked areas. Reel to reel strip plating comprises plating deposited selectively on non-masked areas. Reel to reel tape masking plating comprises plating deposited in a continuous strip to non-masked area while the protected areas are masked with tape.

A gasket surface may be plated using various techniques, such as electroplating and electroless plating, also known as chemical/auto-catalytic plating. Electroplating is a process that uses an electric current to reduce dissolved metal cations so they form a metal coating on an electrode. On the other hand, electroless plating is a non-galvanic plating method that involves several simultaneous reactions in an aqueous solution, which occur without the use of external electrical power.

In an embodiment, electroplating a surface of the gasket 14 comprises placing the gasket on a platen with open windows for an electrolyte and submerging the platen in an electrolyte tank filled with a liquid electrolyte. Metallic ions in the liquid electrolyte are influenced under the electrical field to reduce or precipitate out of solution and deposit on desired areas on a gasket combustion seal.

In an embodiment, electroless plating a surface of the gasket 14 comprises using Electroless Nickel (EN) plating to deposit an even layer of nickel-phosphorous or nickel-boron alloy on the surface of a solid material, or substrate, like metal or plastic. This process involves dipping the substrate in a bath of plating solution. Unlike electroplating, it is not necessary to pass an electric current through the plating solution to form a deposit.

In some embodiments of the method 400, the gasket 14 undergoes non-symmetrical masking. This involves masking a different area on one or both sides of the surface of the gasket 14 than the area(s) that was previously masked in block 430. The result is a variable thickness and stiffness surface of the gasket. Non-symmetrical masking preferably provides additional topography on the surface of the gasket 14 or gasket components. As described herein, non-symmetrical masking is preferably used to create more uniform loading (on the gasket).

Next, as shown in block 450, maskants that have been applied to a surface of the gasket 14 are removed from the gasket 14, as necessary.

The method 400 for creating a variable stiffness surface on the gasket 14 offers significant advantages over previous techniques. The method permits areas of increased thickness and topography on the gasket 14. The areas of increased thickness reduce joint motion and results in increased fatigue resistance of the combustion seal in weak areas. The thickness and plated locations may be varied such that motion may be minimized for the entire combustion opening. In addition, fine tuning may be achieved by varying the specific areas/surfaces that are plated such that one side of a shim may have a larger or a smaller area plated than the other.

Turning now to FIGS. 5-7, improvements in a loading characteristic of the gasket having a shim semi-stopper with plating in a bridge area between adjacent cylinder openings are shown. FIG. 5 illustrates a contrast change of a pressure-sensitive paper after seal line surface pressure tests are performed for a web portion 210 (indicated in FIG. 2) of a gasket before plating. The illustration 500 depicts loading at the seal lines for the adjacent halves of cylinders two 206 and three 208, and the illustration is centered on the web or bridge area (narrow area) of the gasket between the cylinder openings. Darker areas such as 502 and 510 indicate higher load (on the gasket sandwiched between the block and head), and lighter areas such as 504, 506, and 508 show lower loading in those areas. To generate the image, the present inventors used pressure sensitive film (also referred to as Fuji film) positioned between the gasket and the head. The head, gasket, and block (with film between the gasket and head) are assembled, then disassembled, whereafter the film is developed and reviewed to assess loading characteristics for the areas of interest. The illustration 500 corresponds to an MLS type head gasket having a shim semi-stopper and cross-section as shown in FIG. 3A (no plating on the stopper) and consistent with the shim semi-stopper 600 shown in FIG. 6, which illustrates a top plan view of a gasket showing plated areas 626 of a shim semi-stopper 600.

As seen in FIG. 6, specific locations for depositing metallic material are identified in areas between cylinders, namely in bridge areas 626. The area 650 indicated in FIG. 6 corresponds with the area 210 in FIG. 2 and is centered on, as with area 210 in FIG. 2, the bridge area between the second and third (middle two) cylinder openings (of a four cylinder opening gasket configuration). In one embodiment, about 10 microns of aluminum were deposited to each side of the shim semi stopper bridge area 626. As a result of the selective plating, the shim semi stopper bridge area 626 is about 20 microns thicker than the thickness of other surfaces of the gasket 600, providing topography on an otherwise flat shim semi-stopper. The different thicknesses on the gasket 600 result in a variable stiffness gasket.

FIG. 7 illustrates a contrast change of a pressure-sensitive paper after seal line surface pressure tests are performed for a web portion of a gasket after plating. The illustration 700 shows the contact pressure or load results achieved after electroplating aluminum onto the shim semi stopper bridge area that corresponds with area 650 indicated in FIG. 6 (using a high pressure measurement film available from Fuji Film Co., Ltd. as for the illustration 500 in FIG. 5). In FIG. 7, the darker contrast portions 702, 704, and 706 indicate portions of higher load. Lighter areas 708 and 710 indicate areas of lower load.

Comparing FIG. 5 (no plating) and FIG. 7 (with plating), improved loading due to the plating is shown in the bridge area by the considerably darker contrast portions 704 and 706 in FIG. 7 versus counterpart portions 504 and 506 in FIG. 5 (showing considerably lighter contrast).

Sealing pressure improvements for such gasket (with plated shim bridge area as described in FIG. 6) are shown in FIGS. 8A and 8B. FIGS. 8A and 8B depict results of a Finite Element Analysis model simulation showing changes in sealing pressure on a gasket before and after plating, respectively. The FEA model simulates the effect of aluminum electroplated to the shim semi stopper 626 with thickness deposited of 20 microns. This model shows a comparison of sealing pressures for a cylinder electroplated with aluminum at a thickness of 20 microns as compared to cylinder that is not electroplated. The result is about a 45% higher loading for the area on the cylinder electroplated with aluminum at a thickness of 20 microns.

For reference, FIG. 8A shows results for a gasket having a shim semi-stopper (as described in FIG. 6) without plating. The lower sealing pressures in the areas of interest (i.e. the bridge areas during cold firing of the cylinders) is around 32 MPa. The lower sealing pressures shown in FIG. 8B for the same areas of interest is around 45 MPa, representing about 45% higher loading due to the plating applied to the shim semi-stopper.

Turning to FIGS. 9 and 10, embodiments are illustrated wherein plating is selectively added to different areas (including, optionally, plating on one or both sides) of a gasket material component (such as a shim semi-stopper) based on determined weaknesses of a gasket joint, the weaknesses determined based on finite element analysis/FEA simulation and/or pressure film loading testing. FIG. 9 illustrates a top plan view 900 of a shim bridge portion 926 of a gasket plated on both a head side and a block side. As shown, the head side of the bridge portion 926 receives plating within the region bounded by 902 and 904, and the block side of the bridge portion 926 receives plating within the region bounded by 906 and 908. The head side and block side plating regions are, as shown, of unequal surface areas. As shown, the head side region is approximately 10 mm longer than the block side region. In some embodiments, the head and block side regions (where the bridge portion 926) receives plating may be the same. In some embodiments, the block side plating region of the bridge portion 926 may be larger than the head side plating region (i.e. opposite of the relationship shown in FIG. 9.). In the example shown in FIG. 9, both sides of the shim semi stopper 926 are plated with approximately 10 microns of aluminum via a dual-step deposition process.

FIG. 10 illustrates a top plan view of a gasket 1000 plated at multiple locations. FIG. 10 shows a gasket 1000, wherein the entire gasket 1000 is selectively plated in various areas, instead of just at the shim semi-stopper bridge areas 1020 between cylinders. For example, some areas on the shim semi-stopper bridge area 1020 may be plated with 10 microns of plating material, while other areas on the shim semi-stopper bridge area 1020 may be plated with 20 microns, and still other areas such as 1002, 1004, 1006, 1008, 1016, 1014, 1012, and 1010 may be plated with 9 microns of material. The result is the formation of surfaces on the gasket 1000 having variable stiffness and thickness, and a gasket 1000 with a shim semi-stopper having a (variable) topography.

In one embodiment, the bridge areas 1020 comprise plated bridge areas as described with respect to FIG. 9. That is, the bridge areas on the head side of the shim semi-stopper are plated (such as, with aluminum) with a larger area than plating on the block side (of the bridge areas). Further in one embodiment, areas 1002, 1004, 1006, 1008, 1016, 1014, 1012, and 1010 shown in FIG. 10 comprise portions on the gasket where within the shim semi-stopper in those areas have plating only on the head side of the shim semi-stopper. The gasket shown in FIG. 10, according to preferred embodiments, comprises a multiple-layer steel (MLS) type cylinder-head gasket with a shim semi-stopper layer sandwiched between at least two (active) layers, with plating on selected portions of the shim semi-stopper as shown and described.

As shown in FIG. 10, the areas of plating on the shim semi-stopper need not be symmetric about a particular cylinder opening, or consistent from one cylinder to the next. For example, the plating area 1016 is only a small area of plating and is differently sized and located than other plating areas shown. Also, the non-bridge area plating areas do not need to be on the head side only, as shown and described in FIG. 10.

It will be appreciated that the configurations and routines disclosed herein are exemplary in nature, and that these specific embodiments are not to be considered in a limiting sense, because numerous variations are possible. For example, the above technology can be applied to vehicles with engines having a variety of suitable configurations (e.g., V-4, I-4, I6, opposed 4, and other engine types). The subject matter of the present disclosure includes all novel and non-obvious combinations and sub-combinations of the various systems and configurations, and other features, functions, and/or properties disclosed herein.

As used herein, the terms "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A multi-layer head gasket, comprising:
   at least two active layers;
   a shim layer sandwiched between the at least two active layers;
   the active layers and the shim layer having aligned cylinder openings adapted such that the multi-layer gasket is sealably securable between an engine head and an engine block, and such that the cylinder openings of the gasket align with cylinders disposed within the engine block; and
   a plated portion of the shim layer, the plated portion comprising deposited metallic material adding topography to an otherwise flat shim layer such that the shim layer includes at least one unplated portion encircling at least one of the cylinder openings, thereby providing topography between the plated and unplated portions of the shim layer, wherein the plated portion comprises bridge areas between adjacent cylinder openings and plating on both a head side of the bridge areas and a block side of the bridge areas, and wherein the plating on the head side covers a different surface area than the plating on the block side of each of the bridge areas.

2. The gasket of claim 1, wherein the metallic material comprises copper, nickel, nickel Teflon, electroless nickel, aluminum, and/or any combination thereof.

3. The gasket of claim 1, wherein the plated portion comprises metallic material deposited on a shim layer surface via electroplating.

4. The gasket of claim 1, wherein the plated portion comprises metallic material deposited on a shim layer surface via electroless plating.

5. The gasket of claim 1, wherein the plated portion comprises between about 5 and 30 microns of metallic material deposited on at least one side of the shim layer.

6. The gasket of claim 1, wherein an area of the plating portion is determined by finite element analysis.

7. The gasket of claim 1, wherein the plated portion comprises a plurality of individual portions of the shim layer, each of the individual portions positioned about the perimeter of one or more of the cylinder openings.

8. A shim layer for use in a multi-layer head gasket, comprising:
a substantially planar shim layer adapted to be interleaved between two active layers of the multi-layer gasket;
the active layers and the shim layer having aligned cylinder openings adapted such that the multi-layer gasket is sealably securable between an engine head and an engine block, and such that the cylinder openings of the gasket align with cylinders disposed within the engine block; and
a plated portion of the shim layer, the plated portion comprises deposited metallic material adding topography to an otherwise flat shim layer such that the shim layer includes at least one unplated portion encircling at least one of the cylinder openings, thereby providing topography between the plated and unplated portions of the shim layer, wherein the plated portion comprises bridge areas between adjacent cylinder openings and plating on both a head side of the bridge areas and a block side of the bridge areas, and wherein the plating on the head side covers a different surface area than the plating on the block side of each of the bridge areas.

9. The shim layer of claim 8, wherein the metallic material comprises aluminum, copper, nickel, electroless nickel, nickel Teflon, and/or any combination thereof.

10. The shim layer of claim 8, wherein the plated portion comprises metallic material deposited on a shim layer surface via electroplating or via electroless plating.

11. The shim layer of claim 8, wherein the plated portion comprises between about 5 and 30 microns of metallic material deposited on at least one side of the shim layer.

12. The shim layer of claim 8, wherein an area of the plated portion is determined by finite element analysis.

13. The shim layer of claim 8, wherein the plated portion comprises a plurality of individual portions of the shim layer, each of the individual portions positioned about the perimeter of one or more of the cylinder openings.

14. A multi-layer head gasket, comprising:
at least two active layers;
a shim layer sandwiched between the at least two active layers;
the active layers and the shim layer having aligned cylinder openings adapted such that the multi-layer gasket is sealably securable between an engine head and an engine block, and such that the cylinder openings of the gasket align with cylinders disposed within the engine block; and
a plated portion of the shim layer, the plated portion comprising deposited metallic material adding topography to an otherwise flat shim layer such that the shim layer includes at least one unplated portion encircling at least one of the cylinder openings, thereby providing topography between the plated and unplated portions of the shim layer, wherein the plated portion comprises bridge areas between adjacent cylinder openings and plating on a head side of the bridge areas and a block side of the bridge areas, wherein plating on the head side covers a different surface area than plating on the block side of each of the bridge areas, and wherein a thickness of the bridge areas is greater than a thickness of other portions of the multi-layer head gasket.

* * * * *